US006414936B1

United States Patent
Cho et al.

(10) Patent No.: US 6,414,936 B1
(45) Date of Patent: Jul. 2, 2002

(54) METHOD OF ESTIMATING CARRIER FREQUENCY OFFSET IN AN ORTHOGONAL FREQUENCY DIVISION MULTIPLEXING SYSTEM

(75) Inventors: Jin-Woong Cho; Yong-Bae Dhong; Hyoung-Kyu Song; Jong-Ho Paik, all of Kyungki-do; Yong-Soo Cho; Hyung-Gi Kim, both of Seoul, all of (KR)

(73) Assignee: Korea Electronics Technology Institute, Kyunggi-Do (KR)

( * ) Notice: Subject to any disclaimer, the term of this patent is extended or adjusted under 35 U.S.C. 154(b) by 0 days.

(21) Appl. No.: 09/195,074

(22) Filed: Nov. 18, 1998

(30) Foreign Application Priority Data

Sep. 7, 1998 (KR) ............................................. 98-36798

(51) Int. Cl.[7] ................................................. H04L 7/00
(52) U.S. Cl. ........................ 370/208; 375/326; 375/355
(58) Field of Search ................................ 370/203, 204, 370/206, 208, 210; 375/326, 355, 371

(56) References Cited

U.S. PATENT DOCUMENTS 5,166,924 A * 11/1992 Moose ........................ 370/208
5,732,113 A * 3/1998 Schmidl et al. ............. 375/355
5,802,117 A * 9/1998 Ghosh ......................... 375/355

OTHER PUBLICATIONS

Moose, A Technique for Orthogonal Frequency Division Multiplexing Frequency Offset Correction, IEEE, pp. 2908–2914, Oct. 1994.*

Van De Beek et al, ML Estimation of Time and Frequency Offset in OFDM Systems, IEEE, pp. 1800–1805, Jul. 1997.*

Schmidl et al, Robust Frequency and Timing Synchronization for OFDM, IEEE, pp. 1613–1621, Dec. 1997.*

* cited by examiner

Primary Examiner—Wellington Chin
Assistant Examiner—Frank Duong
(74) Attorney, Agent, or Firm—Alston & Bird LLP (57) ABSTRACT

Disclosed is a method of estimating carrier frequency offset in an OFDM system. The method includes the steps of forming one OFDM symbol which has M repeated identical signal block, being a base sub-block; forming a $2^i$ number of identical ith sub-blocks using an $M/2^i$ number of the M number of base sub-blocks as a unit; and estimating an ith carrier frequency offset $\epsilon_i$ using a correlation between two adjacent ith sub-blocks in the $8^i$ number of the ith sub-blocks.

9 Claims, 4 Drawing Sheets

FIG.1(PRIOR)

FIG.2

| $A_0$ | $A_1$ | ··· | $A_{M-2}$ | $A_{M-1}$ |

METHOD OF ESTIMATING CARRIER FREQUENCY OFFSET IN AN ORTHOGONAL FREQUENCY DIVISION MULTIPLEXING SYSTEM

BACKGROUND OF THE INVENTION (a) Field of the Invention

The present invention relates to a method of estimating carrier frequency offset in an OFDM (orthogonal frequency division multiplexing) system. More particularly, the present invention relates to a method of estimating carrier frequency offset in an OFDM system in which a repetitive signal structure inside of a 1 OFDM symbol is used to enlarge the range and increase the accuracy of offset estimation.

(b) Description of the Related Art

OFDM systems are used for high-speed data transmission. In the OFDM system, input bits are converted to data symbols (Xk), and the data symbols are modulated to OFDM symbols through an OFDM modulator using IFFT (inverse fast Fourier transform), and then transmitted to a receiver. At this time, the OFDM symbols are comprised of an N samples and a cyclic prefix, which is a copy of the last part of the OFDM symbol. The cyclic prefix is introduced to maintain orthogonality between sub-carriers, and is, in general, assumed to be longer than the impulse response of a time-dispersive channel.

In the receiver, after compensating for the carrier frequency offset of the received signals and removing the cyclic prefix, a FFT is executed and the data symbols are demodulated.

An offset estimation method of carrier frequency proposed by Schmidl has been widely used among those. In this method, two identical signal intervals are made in a 1 OFDM reference symbols within a time domain, and the carrier frequency offset is estimated by using these signals.

The conventional method for estimating carrier frequency offset will be described hereinafter.

In an OFDM system, when there is carrier frequency offset, a phase of a received signal ($y_n$) is changed with time by a carrier frequency ($\epsilon$) in a time domain as shown in Equation 1 below.

$$y_n = x_n e^{j\pi\epsilon n/N} \qquad \text{[Equation 1]}$$

where $x_n$ is a transmitted time-domain signal of reference OFDM symbol designed to estimate carrier frequency offset and $\epsilon$ is a carrier frequency offset normalized to a sub-carrier spacing. N denotes the number of samples, that is, FFT size.

In the case where two identical signals are transmitted, each signal having N/2 number of samples, Equation 2 below can be obtained by correlating them.

$$\sum_{n=0}^{N/2-1} y_n^* y_{N/2+n} = \sum_{N=0}^{N/2-1} (x_n e^{j2\pi\epsilon n/N})^+ (x_{N/2+n} e^{j2\pi\epsilon(N/2+n)/N}) \qquad \text{[Equation 2]}$$

$$= e^{j\pi\epsilon} \sum_{n=0}^{N/2-1} |x_n|^2$$

where $x_n$ and $x_{N/2+n}$ (n=0, 1, 2, 3, . . . , N/2−1) are repeated identical signals in one OFDM symbol. Here * denotes a complex conjugate.

In Equation 2, as $|x_n|^2$ has a real number value, the carrier frequency offset ($\epsilon$) can be obtained by the following Equation 3.

$$\varepsilon = \frac{1}{\pi} \arg\left(\sum_{n=0}^{N/2-1} y_n^* y_{\frac{N}{2}+n}\right) \qquad \text{[Equation 3]}$$

where arg is an argument function having a value from $-\pi$ to $\pi$. Therefore, according to the conventional method for estimating carrier frequency offset, a possible estimation range of carrier frequency offset is limited to $|\epsilon|<1$.

Figure 1:
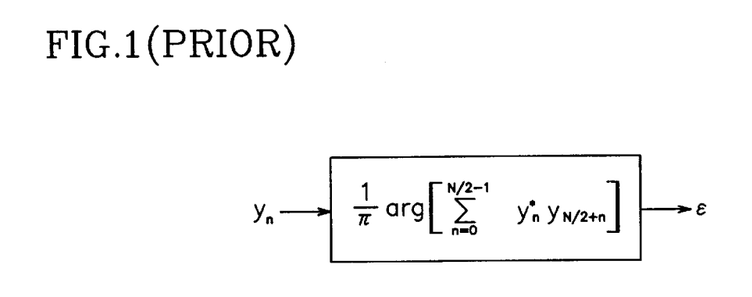
FIG. 1 is a block diagram of a conventional method for estimating carrier frequency offset.

FIG. 1 shows a block diagram of a conventional method for estimating carrier frequency offset. As shown in the drawing, in the conventional method, signals $y_n$ are received in a time domain, and a value for the signals is placed in Equation 3 to estimate carrier frequency offset.

However, it is common that the carrier frequency offset caused by oscillator instability, thermal noise in a base station and a mobile station exceeds the limited estimation range, $|\epsilon|<1$. As a result, the estimation of carrier frequency offset can be failed for a large value.

SUMMARY OF THE INVENTION

The present invention has been made in an effort to solve the above problem.

It is an object of the present invention to provide a method of estimating carrier frequency offset in an OFDM system in which a range of carrier frequency offset estimation is enlarged and accuracy of the same is maintained by using only time-domain received signal.

To achieve the above object, the present invention provides a method of estimating carrier frequency offset in an OFDM system. The method includes the steps of forming a 1 OFDM symbol using an N samples, which has M repeated identical sub-blocks, form a $2^i$ number of identical ith sub-blocks using an $M/2^i$ number of the M number of base sub-blocks as a unit; and estimating an ith carrier frequency offset $\epsilon_i$ using a correlation between two adjacent ith sub-blocks in the $2^i$ number of ith sub-blocks.

According to a feature of the present invention, the offset $\epsilon_i$ of the ith carrier frequency is estimated using the following equation:

$$\hat{\varepsilon}_i = \frac{2^i}{2\pi} \arg\left(\sum_{n=0}^{N/2^i-1} y_n^* y_{\frac{N}{2^i}+n}\right)$$

where * is a complex conjugate and $y_n$ is a received signal.

According to another feature of the present invention, M satisfies the condition of $2^k$ (k=a positive integer).

According to yet another feature of the present invention, the method further includes the step of obtaining an enlarged ith carrier frequency offset estimate values $\epsilon_i(q_i)$ from the estimated ith carrier frequency offset $\hat{\epsilon}_i$, the offset estimate values $\epsilon_i(q_i)$ satisfying the condition of $\epsilon_i(q_i)=2^i q_i + \hat{\epsilon}_i$ (i=1, 2,3,4 . . . ,k), where $-2^{k-(i+1)} \leq q_i < 2^{k-(i+1)}$ when $\hat{\epsilon}_i \geq 0$, and $\epsilon_i(q_i) = -2^{k-(i+1)} + 1 \leq q_i < 2^{k-(i+1)} + 1$ when $\hat{\epsilon}_i < 0$.

According to still yet another feature of the present invention, the method further includes the steps of selecting values closest to $\epsilon_p(q_p)$ values among $\epsilon_1(q_1)$ values, where p<k; and obtaining carrier frequency offset from the selected $\epsilon_1(q_1)$ values.

According to still yet another feature of the present invention, the method further includes the steps of selecting values closest to a $\epsilon_2(q_2)$ value among $\epsilon_1(q_1)$ value; selecting values closest to $\epsilon_3(q_3)$ values among the selected $\epsilon_1(q_1)$ values; selecting $\epsilon_1(q_1)$ value closest to $\epsilon_p(q_p)$ values by repeating the above step, where p≦k; and obtaining carrier frequency offset from the selected $\epsilon_1(q_1)$ value.

According to still yet another feature of the present invention, p=k, and a last remaining value among the $\epsilon_1(q_1)$ values is a carrier frequency offset.

According to still yet another feature of the present invention, the 1 OFDM symbol is obtained by using a data symbol Xk of a frequency scope having a random symbol that is not 0 in a sub-channel corresponding to a constant multiple of M, and having a 0 value in remaining portions.

According to still yet another feature of the present invention, the data symbol Xk of a frequency scope satisfies the condition of $X_k = \sqrt{M} X_m^D$ when k =mM (m=0, 1, 2, ..., N/M−1), where $X_k$ is a transmitted symbol to a kth sub-carrier, and $X_m^D$ refers to a random symbol other than 0, and k is 0 with other values.

BRIEF DESCRIPTION OF THE DRAWINGS

Further objects and other advantages of the present invention will become apparent from the following description in conjunction with the attached drawings, in which.

DETAILED DESCRIPTION OF THE PREFERRED EMBODIMENTS

Preferred embodiments of the present invention will now be described in detail with reference to the accompanying drawings.

Figure 2:
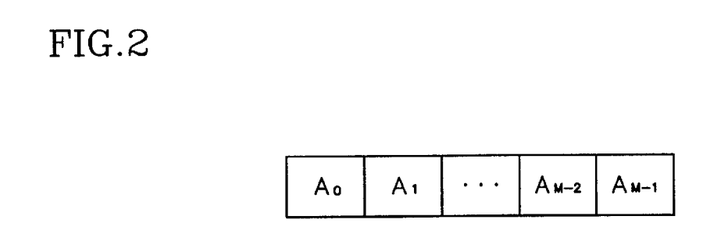
FIG. 2 is a schematic drawing of a time domain 1 OFDM symbol used in a first preferred embodiment of the present invention.

Referring first to FIG. 2, in a method for estimating carrier frequency offset according to a first preferred embodiment of the present invention, a time domain 1 OFDM symbol (composed of N samples) is comprised of signals repeated M number of times (M=$2^k$, where k is a positive integer). At this time, a signal portion that is repeated in minimum(i.e., A0, A1, ..., $A_{M-1}$) is defined as a base sub-block.

Figure 3:
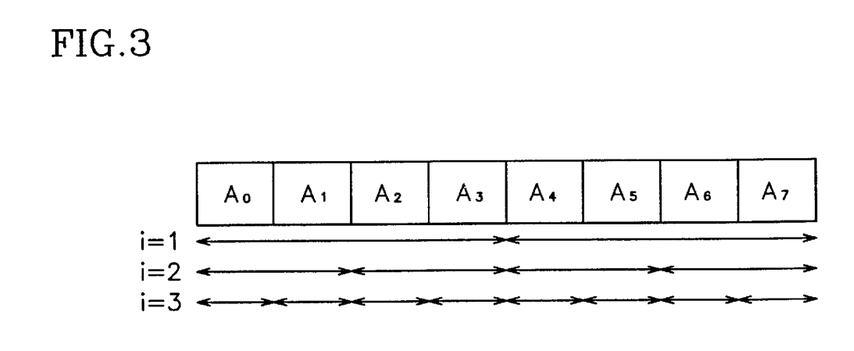
FIG. 3 is a schematic drawing of a time domain 1 OFDM symbol realized through 8 sub-blocks used in the first preferred embodiment of the present invention.

In such a symbol structure, an M/2 number of base sub-blocks are bundled to obtain a new primary sub-block such that two primary sub-blocks of an N/2 samples come to exist in the 1 OFDM symbol. Further, an M/4 number of base sub-blocks are bundled to obtain a new second sub-block such that four secondary sub-blocks come to exist in the 1 OFDM symbol. In the same manner, M/$2^i$ of base sub-blocks are bundled to obtain a $2^i$ number of ith sub-blocks. A final kth sub-block is identical to the base sub-block. An example of a time domain 1 OFDM symbol structure when M=8 is illustrated in FIG. 3.

In the first preferred embodiment of the present invention, a correlation between two adjacent its sub-blocks is used to estimate carrier frequency offset.

First, assuming that a signal interval between two identical symbols is $\Delta$ (i.e. $X_n = X_{n+\Delta}$), Equation 2 can be changed into Equation 4 below.

$$\sum_{n=1}^{\Delta-1} y_n^* y_{n+\Delta} = \sum_{n=0}^{\Delta-1} (x_n e^{j\pi\epsilon/N}) * (x_{n+\Delta} e^{j\pi\epsilon(n-\Delta)/N})$$

$$= e^{j\pi\epsilon\Delta/N} \sum_{n=0}^{\Delta-1} |x_n|^2$$

[Equation 4]

Since, $\Delta = N/2^i$ in the case of the ith sub-block, $\epsilon_i$ can be obtained by Equation 5 below derived from Equation 4.

$$\hat{\epsilon}_i = \frac{2^i}{2\pi} \arg\left(\sum_{n=0}^{N/2^i-1} y_n^* y_{\frac{N}{2^i}+n}\right)$$

[Equation 5]

where $\hat{\epsilon}_i$ represents carrier frequency offset when using an ith sub-block. At this time, an estimation range of carrier frequency offset is defined as $|\epsilon_i| < 2^{i-1}$.

Accordingly, if the carrier frequency offset is obtained using a high degree sub-block, the range of estimation is increased. As a result, it is possible to estimate the large carrier frequency offset which is caused by oscillator instability and thermal noise in a base station and mobile station.

However, in the method of estimating carrier frequency offset according to the first preferred embodiment of the present invention, the number of samples becomes N/$2^i$ in the case of the ith sub-block. That is, because the number of samples deceases exponentially with the increase of the degree of sub-block used for carrier frequency offset estimation, the accuracy of the carrier frequency offset estimation is reduced.

In a method of estimating carrier frequency offset in an OFDM system according to a second preferred embodiment of the present invention, the range of estimation is increased by utilizing the above description, and a high level of accuracy in an estimation value is ensured as in the Schmidl's method only by processing the received signal in time-domain. That is, in the method according to the second preferred embodiment of the present invention, a multistage estimation algorithm (MEA) is combined with the method of the first preferred embodiment to achieve increased range.

In the MEA according to the second preferred embodiment, characteristics of the value of $\hat{\epsilon}_i$ and the argument function of Equation 5 are used.

Using the properties of the argument function, the value of $\hat{\epsilon}_i$ estimated using Equation 5 can be used to obtain all possible values of carrier frequency offset $\epsilon_i(q_i)$ which can be obtained using ith sub-block.

$$\epsilon_i(q_i) = 2^i q_i + \hat{\epsilon}_i, \; i=1,2,\ldots,k$$

[Equation 6]

where $\epsilon_i(q_i)$ represents an estimated carrier frequency offset value at ith step, and $q_i$ is an integer satisfying the following conditions of Equation 7.

$$-2^{k-(i+1)} \leq q_i < 2^{k-(i+1)}, \; \epsilon_i \geq 0$$

$$-2^{k-(i+1)}+1 \leq q_i < 2^{k-(i+1)}+1, \; \epsilon_i < 0$$

[Equation 7]

As shown by Equations 6 and 7, in each step the estimated offset value $\epsilon_i(q_i)$ has various values according to $q_i$. Accordingly, the number of offset values is reduced by ½ according to the increase in step i, because the intervals ($2^i$) between adjacent $\epsilon_i(q_i)$ values at each step increase by two times.

Figure 4:
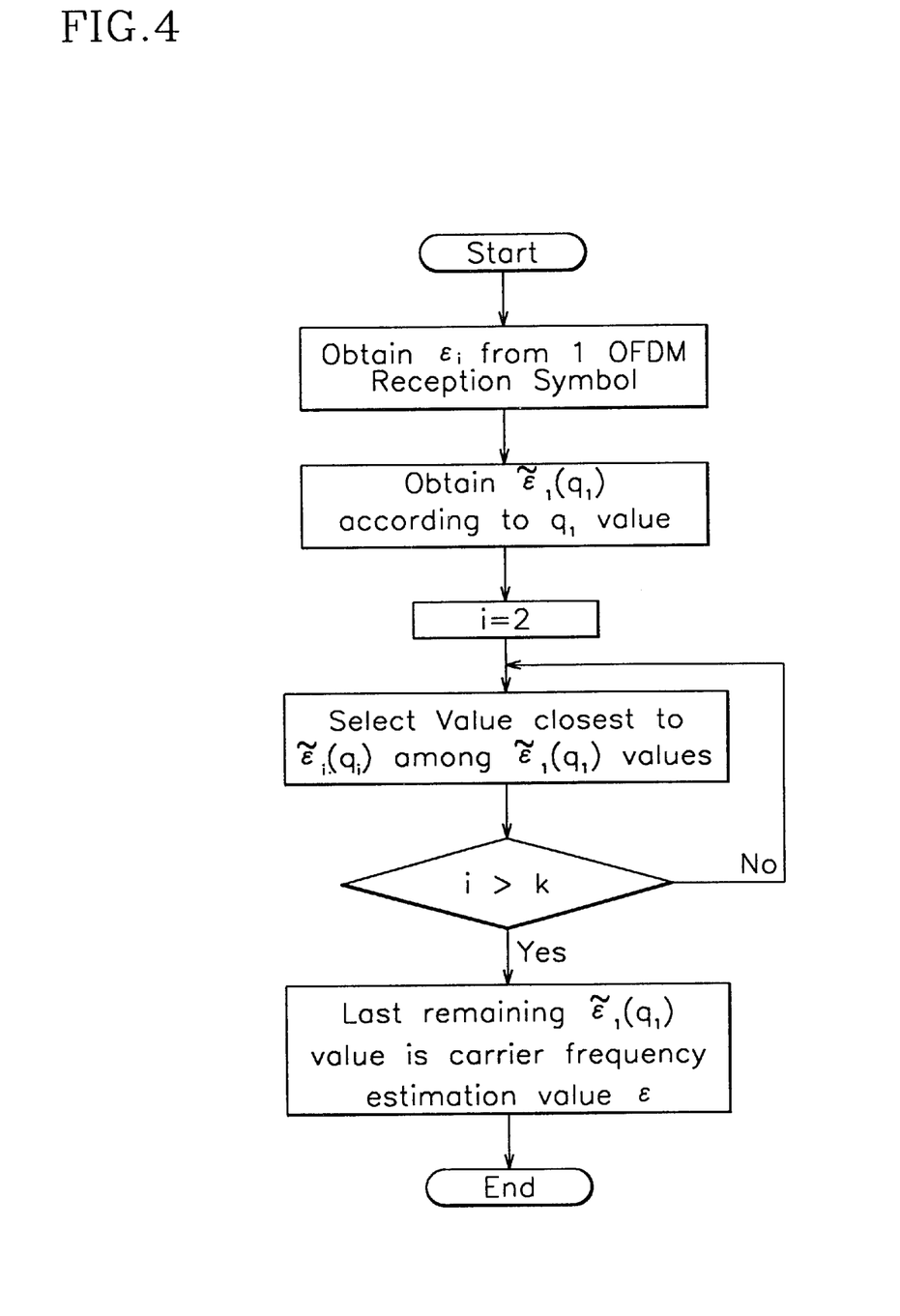
FIG. 4 is a flow chart of a method for establishing carrier frequency offset according to the second preferred embodiment of the present invention.
Figure 5:
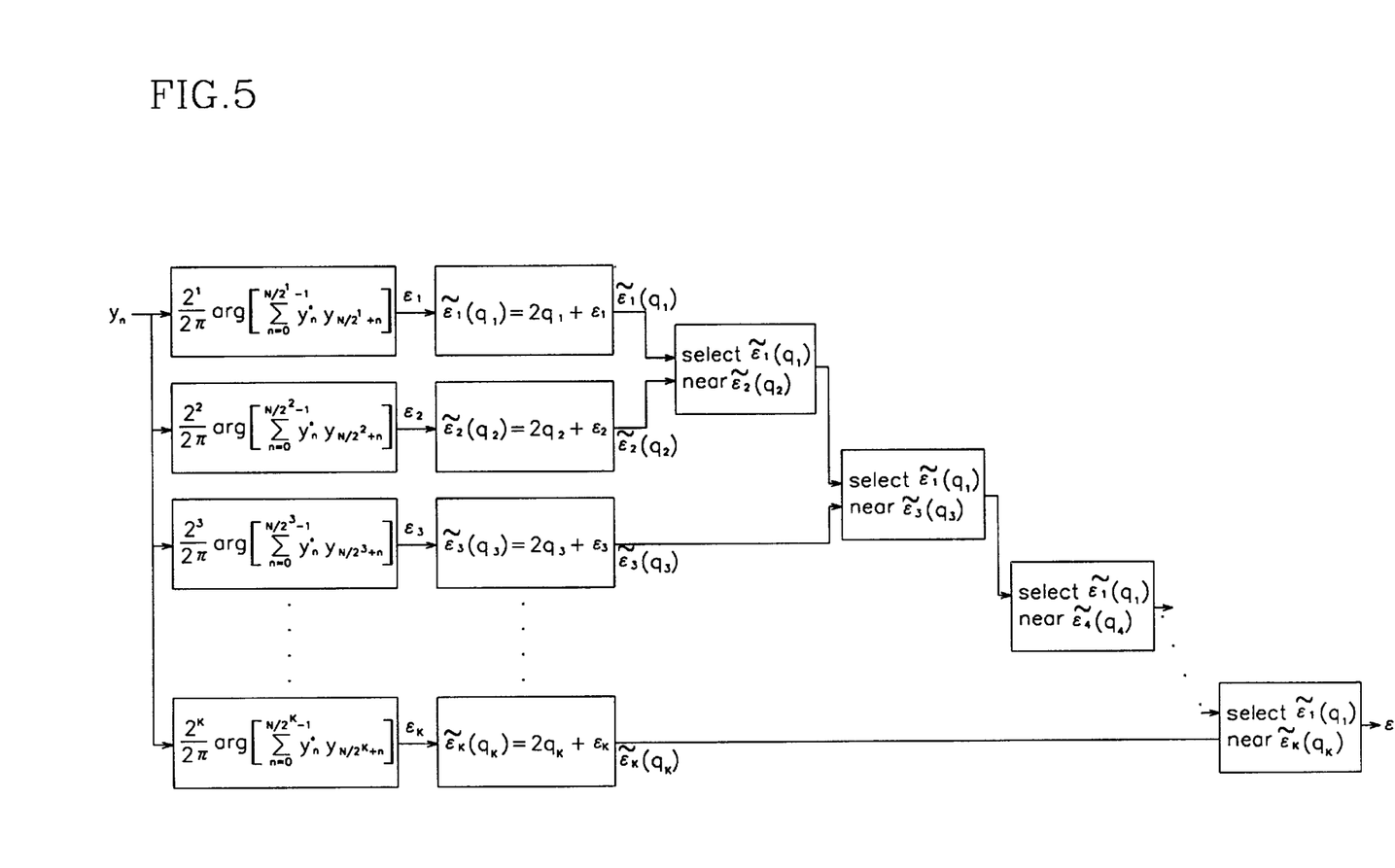
FIG. 5 is a block diagram of a method for estimating carrier frequency offset according to the second preferred embodiment of the present invention.

The method of estimating carrier frequency offset according to the second preferred embodiment of the present invention will be described hereinbelow with reference to FIGS. 4 and 5.

First, $\hat{\epsilon}_I$ is obtained from 1 OFDM using Equation 5. Next, all $\epsilon_1(q_1)$ values existing within the range of estimation ($\epsilon_1(q_1) < 2^{i-1}$) for carrier frequency offset are obtained. This range refers to the estimation range of carrier frequency offset solely obtained using a kth sub-block.

Subsequently, $\epsilon_2(q_2)$ values within the range of estimation are obtained. Since an interval ($2^2$) between the $\epsilon_2(q_2)$ values according to $q_2$ is twice that ($2^1$) between the $\epsilon_1(q_1)$ values, the number of $\epsilon_2(q_2)$ values is ½ the number of $\epsilon_1(q_1)$ values within the range, solely obtained using an kth sub-block. If the $\epsilon_1(q_1)$ values closest to the $\epsilon_2(q_2)$ values are selected, the number of $\epsilon_1(q_1)$ values is reduced by ½, thereby becoming identical to the number of $\epsilon_2(q_2)$ values. If this process is continued to $\epsilon_k(q_k)$ values, only a single $\epsilon_1(q_1)$ value is left remaining. This single $\epsilon_1(q_1)$ value is the estimated offset value of carrier frequencies obtained through MEA.

At this time, since the value estimated through the MEA is one of the $\epsilon_1(q_1)$ values, the accuracy of estimation is equal to that when a primary sub-block is used to obtain the estimation value (i.e. when Schmidl's method is used).

Figure 6:
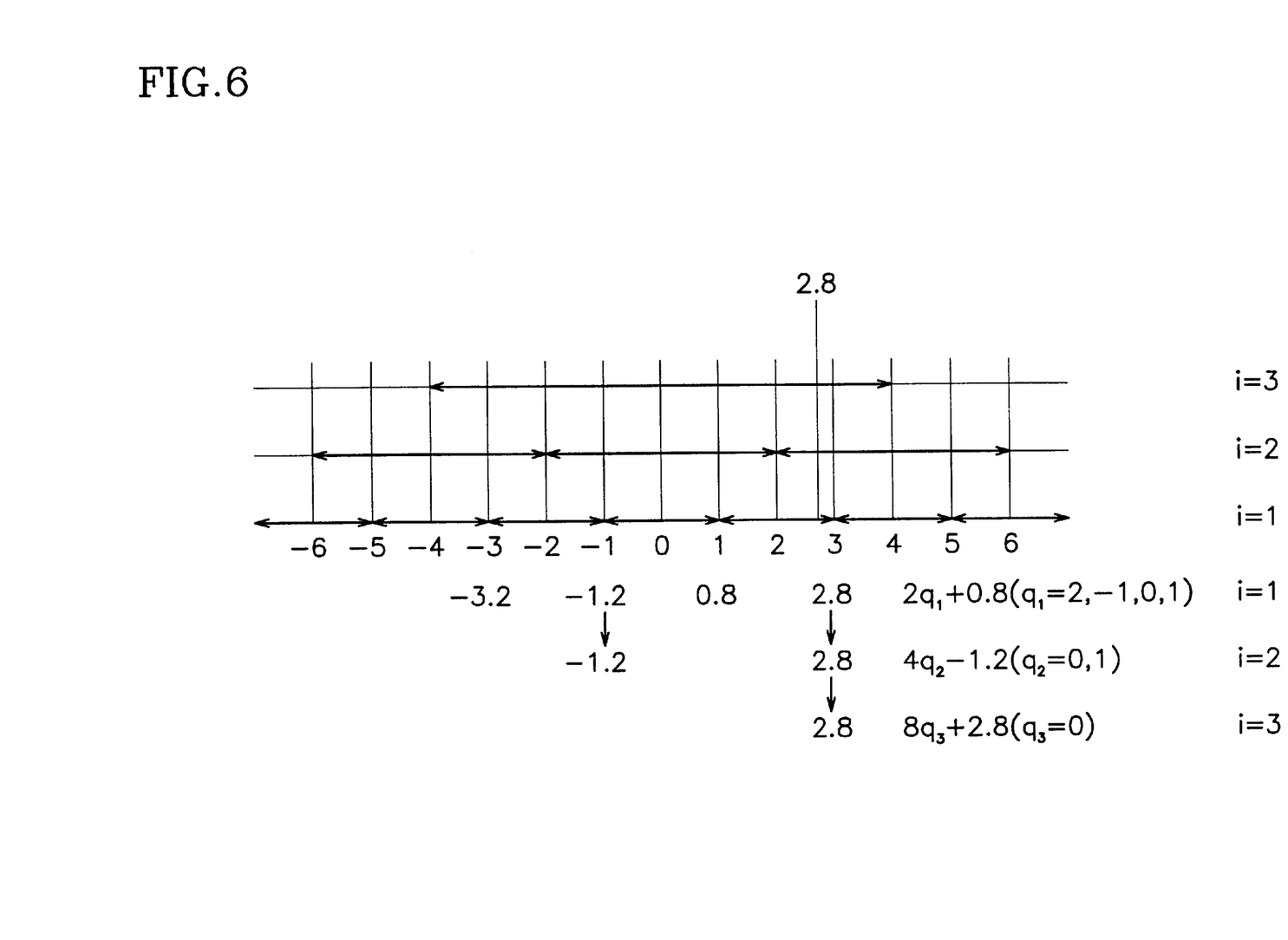
FIG. 6 is a chart used to describe an example for estimating carrier frequency offset according to the second preferred embodiment of the present invention.

FIG. 6 is a chart used to describe an example for estimating carrier frequency offset according to a second preferred embodiment of the present invention. The example is that of estimating $\epsilon = 2.8$ with respect to the symbol structure shown in FIG. 2.

An OFDM system using an N number of orthogonal sub-carriers is modulated by IFFT (inverse fast Fourier transform). Accordingly, in the second embodiment of the present invention, an OFDM symbol with M repeated signal block is obtained using Equation 8 below, with a data symbol $X_k$ having the following conditions.

$$X_k = \sqrt{M} X_m^D, \quad k = mM \ (m=0,1,2 \ldots, N/M-1) \quad \text{[Equation 8]}$$

0, otherwise where $X_k$ is a transmitted symbol to kth sub-carrier, and $X_m^D$ refers to a random symbol.

In the second preferred embodiment of the present invention, a random symbol is inserted in a sub-channel corresponding to a constant multiple of M, and 0 is inserted in remaining portions. Further, a power of a symbol is increased by as much as $\sqrt{M}$ and transmitted to prevent the reduction in power caused by the insertion of 0s.

In the second preferred embodiment, it was described all sub-blocks to a maximal degree are used to estimate carrier frequency offset, but in the case when carrier frequency offset is not large as a result of good channel conditions, it is possible to use a sub-block of a degree lower than the maximal degree sub-block to estimate the carrier frequency offset.

Further, if the offset value of carrier frequencies, estimated using high-degree sub-blocks, is accurate, it is possible to directly selected the $\epsilon_1(q_1)$ values from the estimated carrier frequency offset using the high-degree sub-blocks, without requiring the use of all the consecutive lower-degree sub-blocks. Utilizing this method, the amount of calculation needed is minimized.

In the method of estimating carrier frequency offset in an OFDM system of the present invention, the accuracy of estimation is same as that of the conventional method while the range of estimation is increased by using only the received signals in time-domain.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method of estimating carrier frequency offset in an OFDM system comprising the steps of:

forming a1 OFDM symbol, which has a repeated identical signal portion, repeated an M number of times;

forming a $2^i$ number of identical ith sub-blocks using an $M/2^i$ number of base sub-blocks as a unit; and estimating an ith carrier frequency offset $\hat{\epsilon}_i$ using a correlation between two adjacent its sub-blocks in the $2^i$ number of ith sub-blocks.

2. The method of claim 1 wherein the offset $\hat{\epsilon}_i$ of the ith carrier frequency is estimated using the following equation:

$$\hat{\epsilon}_i = \frac{2^i}{2\pi} \arg\left( \sum_{n=0}^{N/2^i - 1} y_n^* y_{\frac{N}{2^i}+n} \right)$$

where * is a complex conjugate and $y_n$ is a received signal.

3. The method of claim 2 wherein M satisfies the condition of $2^k$ (k=a positive integer).

4. The method of claim 3 further comprising the step of obtaining an enlarged ith carrier frequency offset estimate values $\epsilon_i(q_i)$ from the estimated ith carrier frequency offset $\epsilon_i$, the offset estimate values $\epsilon_i(q_i)$ satisfying the condition of $\epsilon_i(q_i) = 2^i q_i + \epsilon_i$ (i=1,2,3,4 ... ,k), where $-2^{k-(i+1)} \leq q_i < 2^{k-(i+1)}$ when $\hat{\epsilon}_i \geq 0$, and $\epsilon_i(q_i) = 31 \ 2^{k-(i+1)} + 1 \leq q_i < 2^{k-(i+1)} + 1$ when $\hat{\epsilon}_i < 0$.

5. The method of claim 4 further comprising the steps of:

selecting values closest to $\epsilon_p(q_p)$ values, when p<k, among $\epsilon_1(q_1)$ values; and obtaining carrier frequency offset from the selected $\epsilon_1(q_1)$ values.

6. The method of claim 4 further comprising the steps of:

selecting values closest to $\epsilon_2(q_2)$ values among $\epsilon_1(q_1)$ values;

selecting values closest to $\epsilon_3(q_3)$ value among the selected $\epsilon_1(q_1)$ values;

selecting $\epsilon_1(q_1)$ value closest to a $\epsilon_p(q_p)$ value by repeating the above step, where p<k; and obtaining the carrier frequency offset from the selected $\epsilon_1(q_1)$ value.

7. The method of claim 6 wherein p=32 k, and a last remaining value among the $\epsilon_1(q_1)$ value is a carrier frequency offset.

8. The method of claim 2 wherein the 1 OFDM symbol is obtained by using a data symbol Xk of a frequency scope having a random symbol that is not 0 in a sub-channel corresponding to a constant multiple of M, and having a 0 value in remaining portions.

9. The method of claim 8 wherein the data symbol Xk of a frequency scope satisfies the condition of $X_k = \sqrt{M} X_m^D$ when $k = mM$ (m=0,1,2 ..., N/M-1), where $X_k$ is a symbol transmitted to kth sub-carrier, and $X_m^D$ refers to a random symbol other than 0, and k is 0 with other values.

* * * * *

UNITED STATES PATENT AND TRADEMARK OFFICE
CERTIFICATE OF CORRECTION

PATENT NO. : 6,414,936 B1
DATED : July 2, 2002
INVENTOR(S) : Cho et al.

It is certified that error appears in the above-identified patent and that said Letters Patent is hereby corrected as shown below:

Title page,
Item [30], Foreign Application Priority Data, "98-36798" should read -- 98-36793 --.

Item [57], ABSTRACT,
Line 8, "$8^i$" should read -- $2^i$ --.

Column 1,
Lines 44-46, the formula should appear as follows:

$$-- \quad y_n = x_n e^{j2\pi\varepsilon n/N} \quad --.$$

Lines 55-60, should appear as follows:

$$-- \quad \sum_{n=0}^{N/2-1} y_n^* y_{N/2+n} = \sum_{n=0}^{N/2-1} (x_n e^{j2\pi\varepsilon n/N})^* (x_{N/2+n} e^{j2\pi\varepsilon(N/2+n)/N})$$
$$= e^{j\pi\varepsilon} \sum_{n=0}^{N/2-1} |x_n|^2 \quad --.$$

Column 2,
Lines 1-4, the formula should appear as follows:

$$-- \quad \varepsilon = \frac{1}{\pi} \arg\left( \sum_{n=0}^{N/2-1} y_n^* y_{\frac{N}{2}+n} \right) \quad --.$$

Lines 41-44, the formula should appear as follows:

$$-- \quad \hat{\varepsilon}_i = \frac{2^i}{2\pi} \arg\left( \sum_{n=0}^{N/2^i-1} y_n^* y_{\frac{N}{2^i}+n} \right) \quad --.$$

UNITED STATES PATENT AND TRADEMARK OFFICE
CERTIFICATE OF CORRECTION

PATENT NO. : 6,414,936 B1
DATED : July 2, 2002
INVENTOR(S) : Cho et al.

It is certified that error appears in the above-identified patent and that said Letters Patent is hereby corrected as shown below:

Column 2, cont'd.,
Lines 49-60, the paragraphs should appear as follows:
--

According to yet another feature of the present invention, the method further includes the step of obtaining an enlarged ith carrier frequency offset estimate values $\tilde{\varepsilon}_i(q_i)$ from the estimated ith carrier frequency offset $\hat{\varepsilon}_i$, the offset estimate values $\tilde{\varepsilon}_i(q_i)$ satisfying the condition of $\tilde{\varepsilon}_i(q_i) = 2^i q_i + \hat{\varepsilon}_i$ (i=1,2,3,4.....,k), where $-2^{k-(i+1)} \leq q_i < 2^{k-(i+1)}$ when $\hat{\varepsilon}_i \geq 0$, and $\tilde{\varepsilon}_i(q_i) = -2^{k-(i+1)} + 1 \leq q_i < 2^{k-(i+1)} + 1$ when $\varepsilon_i < 0$.

According to still yet another feature of the present invention, the method further includes the steps of selecting values closest to $\tilde{\varepsilon}_p(q_p)$ values among $\tilde{\varepsilon}_1(q_1)$ values, where $p \leq k$; and obtaining carrier frequency offset from the selected $\tilde{\varepsilon}_1(q_1)$ values.

--.

Lines 61-67, the paragraph should appear as follows:
--

According to still yet another feature of the present invention, the method further includes the steps of selecting values closest to a $\tilde{\varepsilon}_2(q_2)$ value among $\tilde{\varepsilon}_1(q_1)$ value; selecting values closest to $\tilde{\varepsilon}_3(q_3)$ values among the selected $\tilde{\varepsilon}_1(q_1)$ values; selecting $\tilde{\varepsilon}_1(q_1)$ value closest to $\tilde{\varepsilon}_p(q_p)$ values by repeating the above step, where $p \leq k$; and obtaining carrier frequency offset from the selected $\tilde{\varepsilon}_1(q_1)$ value.

--.

UNITED STATES PATENT AND TRADEMARK OFFICE
CERTIFICATE OF CORRECTION

PATENT NO. : 6,414,936 B1
DATED : July 2, 2002
INVENTOR(S) : Cho et al.

It is certified that error appears in the above-identified patent and that said Letters Patent is hereby corrected as shown below:

Column 3,
Lines 1-3, the paragraph should appear as follows:

-- According to still yet another feature of the present invention, p=k, and a last remaining value among the $\tilde{\varepsilon}_1(q_1)$ values is a carrier frequency offset. --.

Column 4,
Lines 5-10, the formula should appear as follows:

$$-- \sum_{n=1}^{\Delta-1} y_n^* y_{n+\Delta} = \sum_{n=0}^{\Delta-1} (x_n e^{j\pi\varepsilon n/N})^* (x_{n+\Delta} e^{j\pi\varepsilon(n+\Delta)/N}) = e^{j\pi\varepsilon\Delta/N} \sum_{n=0}^{\Delta-1} |x_n|^2 \quad --.$$

Column 4,
Lines 15-18, the formula should appear as follows:

$$-- \quad \hat{\varepsilon}_l = \frac{2^l}{2\pi} \arg\left( \sum_{n=0}^{N/2^l-1} y_n^* y_{\frac{N}{2^l}+n} \right) \quad --.$$

Line 21, after "defined as", the term should appear as follows:

$$-- \quad |\varepsilon_l| < 2^{l-1}. \quad --$$

Lines 46-52, the paragraphs should appear as follows:
--

In the MEA according to the second preferred embodiment, characteristics of the value of $\hat{\varepsilon}_l$ and the argument function of Equation 5 are used.

Using the properties of the argument function, the value of $\hat{\varepsilon}_l$ estimated using Equation 5 can be used to obtain all possible values of carrier frequency offset $\tilde{\varepsilon}_l(q_l)$ which can be obtained using ith sub-block.

--.

UNITED STATES PATENT AND TRADEMARK OFFICE
CERTIFICATE OF CORRECTION

PATENT NO.   : 6,414,936 B1
DATED        : July 2, 2002
INVENTOR(S)  : Cho et al.

It is certified that error appears in the above-identified patent and that said Letters Patent is hereby corrected as shown below:

Column 4, cont'd.,
Line 53, the formula should appear as follows:

-- $\tilde{\varepsilon}_i(q_i) = 2^i q_i + \hat{\varepsilon}_i, \; i=1,2,\ldots,k$ --.

Lines 55-57, the paragraph should appear as follows:

-- where $\tilde{\varepsilon}_i(q_i)$ represents an estimated carrier frequency offset value at ith step, and $q_i$ is an integer satisfying the following conditions of Equation 7. --.

Lines 58, 61, the formula should appear as follows:

$$-2^{k-(i+1)} \leq q_i < 2^{k-(i+1)}, \; \varepsilon_i \geq 0$$

--

$$-2^{k-(i+1)} + 1 \leq q_i < 2^{k-(i+1)} + 1, \; \varepsilon_i < 0$$

--.

Line 66, after the word "adjacent", the term should appear as follows:

-- $\tilde{\varepsilon}_i(q_i)$ --.

Column 5,
Line 5, after the word "First," the term should appear as follows:

-- $\hat{\varepsilon}_i$ --.

Lines 10-24, the paragraphs should appear as follows:

-- Subsequently, $\tilde{\varepsilon}_2(q_2)$ values within the range of estimation are obtained. Since an interval ($2^2$) between the $\tilde{\varepsilon}_2(q_2)$ values according to $q_2$ is twice that ($2^1$) between the $\tilde{\varepsilon}_1(q_1)$ values, the number of $\tilde{\varepsilon}_2(q_2)$ values is 1/2 the number of $\tilde{\varepsilon}_1(q_1)$ values within the range, solely obtained using an kth sub-block. If the $\tilde{\varepsilon}_1(q_1)$ values closest to the $\tilde{\varepsilon}_2(q_2)$ values are selected, the number of $\tilde{\varepsilon}_1(q_1)$ values is reduced by 1/2, thereby becoming identical to the number of $\tilde{\varepsilon}_2(q_2)$ values. If this process is continued to $\tilde{\varepsilon}_k(q_k)$ values, only a single $\tilde{\varepsilon}_1(q_1)$ value is left remaining. This single $\tilde{\varepsilon}_1(q_1)$ value is the estimated offset value of carrier frequencies obtained through MEA.

At this time, since the value estimated through the MEA is one of the $\tilde{\varepsilon}_1(q_1)$ values, the accuracy of estimation is equal to that when a primary sub-block is used to obtain the estimation value (i.e. when Schmidl's method is used). --.

UNITED STATES PATENT AND TRADEMARK OFFICE
CERTIFICATE OF CORRECTION

PATENT NO. : 6,414,936 B1
DATED : July 2, 2002
INVENTOR(S) : Cho et al.

It is certified that error appears in the above-identified patent and that said Letters Patent is hereby corrected as shown below:

Column 5,
Line 37, the formula should appear as follows:

-- $X_k = \sqrt{M} X_m^D$, k = mM (m=0,1,2......, N/M-1) --.

Column 6,
Line 17, "its" should read -- ith --.
Lines 21-24, the formula should appear as follows:

-- $\hat{\varepsilon}_i = \dfrac{2^i}{2\pi} \arg\left( \sum_{n=0}^{N/2^i - 1} y_n^* y_{\frac{N}{2^i}+n} \right)$ --.

Lines 29-35, Claim 4 should appear as follows:
-- The method of claim 3 further comprising the step of obtaining an enlarged ith carrier frequency offset estimate values $\tilde{\varepsilon}_i(q_i)$ from the estimated ith carrier frequency offset $\varepsilon_i$, the offset estimate values $\tilde{\varepsilon}_i(q_i)$ satisfying the condition of $\tilde{\varepsilon}_i(q_i) = 2^i q_i + \varepsilon_i$ (i=1,2,3,4....,k), where $-2^{k-(i+1)} \leq qi < 2^{k-(i+1)}$ when $\hat{\varepsilon}_i \geq 0$, and $\varepsilon_i(q_i) = -2^{k-(i+1)} + 1 \leq q_i < 2^{k-(i+1)} + 1$ when $\hat{\varepsilon}_i < 0$.
--.

Lines 36-41, Claim 5 should appear as follows:
-- The method of claim 4 further comprising the steps of:
selecting values closest to $\tilde{\varepsilon}_p(q_p)$ values, where p < k, among $\tilde{\varepsilon}_1(q_1)$ values; and
obtaining carrier frequency offset from the selected $\tilde{\varepsilon}_1(q_1)$ values.
--.

Lines 42-50, Claim 6 should appear as follows:
-- The method of claim 4 further comprising the steps of:
selecting values closest to $\tilde{\varepsilon}_2(q_2)$ values among $\tilde{\varepsilon}_1(q_1)$ values;
selecting values closest to a $\tilde{\varepsilon}_3(q_3)$ value among the selected $\tilde{\varepsilon}_1(q_1)$ values;
selecting $\tilde{\varepsilon}_1(q_1)$ value closest to a $\tilde{\varepsilon}_p(q_p)$ value by repeating the above step, where $p \leq k$; and
obtaining carrier frequency offset from the selected $\tilde{\varepsilon}_1(q_1)$ value.
--.

UNITED STATES PATENT AND TRADEMARK OFFICE
CERTIFICATE OF CORRECTION

PATENT NO. : 6,414,936 B1
DATED : July 2, 2002
INVENTOR(S) : Cho et al.

It is certified that error appears in the above-identified patent and that said Letters Patent is hereby corrected as shown below:

<u>Column 6, cont'd.,</u>
Lines 51-63, Claim 7 should appear as follows:

-- The method of claim 6 wherein p=k, and a last remaining value among the $\tilde{\varepsilon}_1(q_1)$ value is a carrier frequency offset. --.

Lines 59-63, Claim 9 should appear as follows:

-- The method of claim 8 wherein the data symbol Xk of a frequency scope satisfies the condition of $X_k = \sqrt{M} X_m^D$ when k = mM (m=0,1,2......, N/M-1), where $X_k$ is a symbol transmitted to kth sub-carrier, and $X_m^D$ refers to a random symbol other than 0, and k is 0 with other values.

--.

Signed and Sealed this

Fifteenth Day of April, 2003

JAMES E. ROGAN
*Director of the United States Patent and Trademark Office*